United States Patent [19]

Jenkins et al.

[11] Patent Number: 4,743,085
[45] Date of Patent: May 10, 1988

[54] OPTICAL FIBER CABLE HAVING NON-METALLIC SHEATH SYSTEM

[75] Inventors: Artis C. Jenkins, Lithonia; Parbhubhai D. Patel, Dunwoody, both of Ga.

[73] Assignee: American Telephone and Telegraph Co., AT&T Bell Laboratories, Murray Hill, N.J.

[21] Appl. No.: 867,643

[22] Filed: May 28, 1986

[51] Int. Cl.$^4$ .............................................. G02B 6/44
[52] U.S. Cl. ............................ 350/96.23; 350/96.10
[58] Field of Search ...................................... 350/96.23

[56] References Cited

U.S. PATENT DOCUMENTS

| | | | |
|---|---|---|---|
| 4,146,302 | 3/1979 | Jachimowicz | 350/96.23 |
| 4,169,657 | 10/1979 | Bedard | 350/96.23 |
| 4,241,979 | 12/1980 | Gagen et al. | 350/96.23 |
| 4,330,173 | 5/1982 | Oestreich | 350/96.23 |
| 4,331,378 | 5/1982 | Hartig | 350/96.23 |
| 4,342,500 | 8/1982 | Oestreich et al. | 350/96.23 |
| 4,374,608 | 2/1983 | Anderson | 350/96.23 |
| 4,557,560 | 12/1985 | Bohannon, Jr. et al. | 350/96.23 |

OTHER PUBLICATIONS

D. J. Klassen article entitled *Glass Filament Tapes for Fiber Optic Cables* dated 10/84.

Primary Examiner—William L. Sikes
Assistant Examiner—Akm E. Ullah
Attorney, Agent, or Firm—Edward W. Somers

[57] ABSTRACT

An optical fiber cable (20) includes a core (22) comprising at least one optical fiber (23) which is enclosed in a tubular member (28) and which includes a non-metallic sheath system (30). The sheath system includes two contiguous layers (40, 50) of non-metallic strength members which extend longitudinally along the cable and which are wrapped helically in opposite directions about the tubular member. The layers of strength members are enclosed in a plastic jacket (36). At least some of the strength members which are capable of withstanding expected compressive as well as tensile loading are coupled sufficiently to the jacket to provide a composite arrangement which is effective to inhibit contraction. Those strength members cooperate with the remaining strength members to provide the cable with a predetermined tensile stiffness and to cause the cable to be relatively flexible.

15 Claims, 4 Drawing Sheets

OPTICAL FIBER CABLE HAVING NON-METALLIC SHEATH SYSTEM

TECHNICAL FIELD

This invention relates to an optical fiber cable having a non-metallic sheath system. More particularly, it relates to an optical fiber cable in which non-metallic strength members are disposed in two contiguous layers about a core with some of the strength members being capable of withstanding expected compressive as well as tensile forces.

BACKGROUND OF THE INVENTION

Optical fibers are in widespread use today as transmission media because of their large bandwidth capabilities and small size. Developments in the optical fiber communications field have been rapid. However, the technology still is undergoing major shifts in direction. For example, earlier generation fiber systems were designed to operate at wavelengths of about 0.8 $\mu$m, and current systems operate at 1.3 $\mu$m. Now there is growing interest in systems having an operating wavelength of about 1.55 $\mu$m to take advantage of the loss window that exists in silica-based optical fiber in that wavelength region. Another example of a shift which is driven by demand for higher bandwidths is that from multimode to single mode fibers.

Although desired for their large bandwidth capabilities and small size, light-transmitting optical fibers are mechanically fragile, exhibiting low strain fracture under tensile loading and degraded light transmission when bent. The degradation in transmission which results from bending is known as microbending loss. As a result, cable structures have been developed to protect mechanically the optical fibers in various environments. For example, a cable for use in a duct must be capable of withstanding tensile loads applied when the cable is pulled into the duct and stresses caused by bends.

Cable structures which have been developed for optical fibers include loose tube, stranded and ribbon cables. For a description of loose tube cables, see, for example, D. Lawrence and P. Bark "Recent Developments in Mini-Unit Cable" published at pp. 301-307 of the Proceedings of the 32nd International Wire and Cable Symposium, 1983. See also U.S. Pat. No. 4,153,332. In some situations, especially duct systems which include many bends such as those in loop plant in urban areas, relatively high tensile loads are expected.

In one type of optical communications cable, a plurality of optical fibers are enclosed in an extruded plastic tube to form a unit and a plurality of these tubed units are enclosed in a common extruded plastic tube which is enclosed in a sheath system. Generally, the optical fibers which are enclosed in each tubed unit are stranded together about a central strength member. A central strength member is used because it is relatively easy to assemble into the cable. Also, the cable is easily bent if it has a central strength member. However, when such a cable is bent, the central strength member may in some instances compress one or more of the fibers against a tube and cause damage thereto.

Another optical communications cable is disclosed in U.S. Pat. No. 4,241,979 which issued on Dec. 30, 1980 in the names of P. F. Gagen and M. R. Santana. A bedding layer, about which strength members are wrapped helically, is added between plastic extruded inner and outer jackets to control the extent to which the strength members are encapsulated by the outer jacket. The cable includes two separate layers of metallic strength members, which are wrapped helically in opposite directions. Under a sustained tensile load, these two layers of strength members produce equal but oppositely directed torques about the cable to insure the absence of twisting. Advantageously, the strength members not only provide the necessary strength characteristics for the cable, but also reinforce the sheath and help protect the optical fiber from external influences.

Generally, optical fiber cables of the prior art, such as stranded and loose tube, suffer from the disadvantage of having the stranded units or the tubes manufactured on a separate line. In stranded cable, for example, a plurality of units which priorly have been enclosed individually in tubes and then stranded are fed into a line which applies the common tube and the outer jacket. Each of the units must be made separately on another line and inventoried until a plurality of them are associated together in the common tube.

Clearly, what was needed was a cable for optical fiber transmission which departed from those used in the past and which would inhibit the introduction of undue stresses that could lead to microbending losses in the optical fibers. A cable which satisfies these needs is disclosed in Appl. Ser. No. 721,533 which was filed on Apr. 10, 1985, in the names of C. H. Gartside III, A. J. Panuska, and P. D. Patel. That cable includes a plurality of optical fibers which are assembled together without intended stranding to form units which extend in a direction along a longitudinal axis of the cable. A length of tubing which is made of a plastic material encloses the plurality of units and is parallel to the longitudinal axis of the cable. The ratio of the cross-sectional area of the plurality of optical fibers to the cross-sectional area within the tube does not exceed a predetermined value. A sheath system includes strength members and a jacket which is made of a plastic material and which encloses the length of tubing.

Although the cable of Appl. Ser. No. 721,533 meets the aforementioned needs, efforts have continued to find alternatives. Further, what is desired is a totally dielectric cable. Such a cable which could be run from building ducts to service distribution points would obviate the need for grounding connections at splice points that add to the cost of the cable installations. Also, such a cable decreases substantially the probability of lightning strikes.

In the prior art, to achieve a totally dielectric structure, the metallic wires of the cable in the hereinbefore-identified Gagen-Santana patent have been replaced with glass fiber, rod-like members. The rod-like members are capable of withstanding expected compressive as well as tensile loading. Compressive loading occurs when the cable tends to contract during initial shrinkage of the jacket material and during thermal cycling. However, the use of a sufficient number of glass rods to provide the cable with suitable load carrying capability causes the cable to be relatively stiff. Also, the inner plastic jacket which separates the two layers of oppositely wound rods adds additional steps to the manufacture of the cable.

What is needed and what seemingly is not provided by the prior art is a cable having a compact and relatively flexible non-metallic sheath system which is capable of withstanding compressive as well as tensile loading. The sought-after cable should be adaptable to a variety of environments and accommodate a plurality of optical fibers in a totally dielectric structure. Also, the sought-after cable should be one which is more flexible than those now available commercially and one which does not compromise established strength requirements.

SUMMARY OF THE INVENTION

The foregoing problems of the prior art have been overcome by an optical fiber cable of this invention. The optical fiber cable includes a core comprising one or more optical fibers which may be stranded or one or more optical fiber ribbons and a tubular plastic member which encloses the core. The core and the tubular member are enclosed in a non-metallic sheath system which includes a plastic jacket. Interposed between the tubular member and the jacket is a layer of strength members. A first plurality of the strength members are relatively flexible and a second plurality of the strength members have sufficient compressive stiffness and are coupled sufficiently to the jacket to provide a composite arrangement which is effective to inhibit contraction of the cable. The first and second pluralities of strength members cooperate to provide the cable with a desired load carrying capability at a strain which does not exceed a predetermined value.

In a preferred embodiment, the strength members are disposed in two layers with an inner layer engaging the tubular member and the outer layer engaging the inner layer. Strength members which are capable of resisting expected buckling forces are disposed in the outermost layer whereas strength members which are relatively flexible and which primarily resist tension are disposed in at least the innermost layer. Preferably, the strength members which are capable of resisting buckling are rod-like and comprised of glass fiber filaments whereas the other strength members are relatively flexible and also are comprised of glass filaments.

Prior art cables have included two layers of glass rod-like strength members separated by a plastic jacket. Advantageously, the cable of this invention provides necessary strength requirements by the cooperation between a plurality of rod-like glass fiber members and a plurality of relatively flexible glass fiber members. Further, the cables of this invention do not include an inner plastic jacket between the layers of the strength members.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
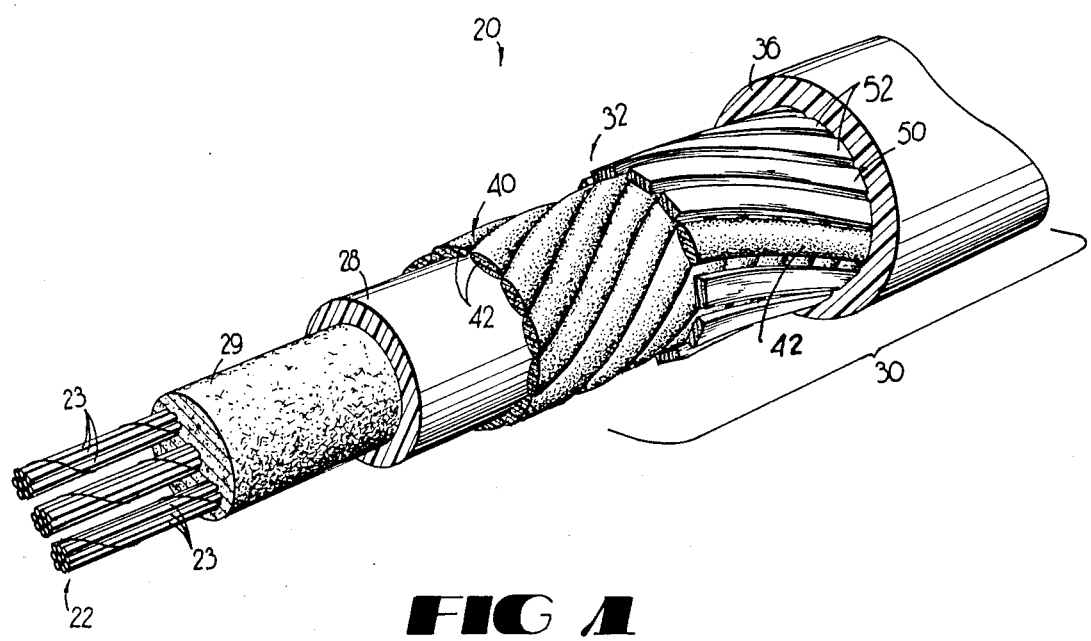
FIG. 1 is a perspective view of an optical fiber cable of this invention.
Figure 2:
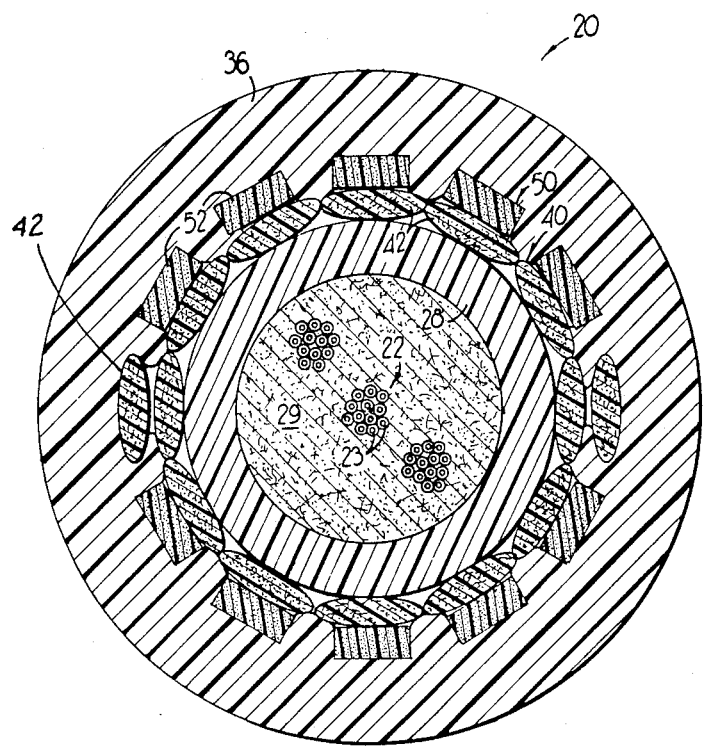
FIG. 2 is an end view of the cable of FIG. 1.

Referring now to FIGS. 1 and 2, there is shown an optical fiber cable 20 of this invention. The optical fiber cable includes a core 22 which comprises one or more optical fibers 23-23. Each optical fiber includes a core and a cladding and a coating which encloses the cladding. The optical fibers 23-23 may be made by the modified chemical vapor deposition process, for example, as disclosed in U.S. Pat. No. 4,217,027 which issued on Aug. 12, 1980 in the names of J. B. MacChesney and P. O'Connor.

The core 22 is enclosed in a tubular member 28 which extends longitudinally along the cable. The tubular member 28 which is sometimes referred to as a core tube is made of a plastic material such as high density polyethylene or polyvinyl chloride (PVC). A suitable waterblocking material 29 may be used to fill the interstices among the optical fibers and between the fibers and the tubular member 28.

Enclosing the core 22 and the tubular member 28 is a non-metallic sheath system which is designated generally by the numeral 30. The non-metallic sheath system 30 includes a strength member system 32 and an outer plastic jacket 36.

The strength member system 32 must meet several criteria. First, it must have sufficient strength in compression to resist stresses induced by thermal cycling as well as bending and in tension to resist stresses induced by bending and by pulling. At least portions of the strength member system must be coupled sufficiently to the jacket so that the portions of the strength member system and the jacket provide a composite arrangement which resists buckling. Further, the cable must be relatively flexible. Also, the cross-sectional shape of the portions of the strength member system must not be overly large.

The strength member system 32 includes an inner first layer 40 of relatively flexible strength members 42-42 which are in engagement with the tubular member 28. Each of the strength members 42-42 comprises a glass fiber member such as a glass roving or yarn marketed by PPG Industries, for example, which is impregnated with a resinous material, for example. In a preferred embodiment, each of the strength members 42-42 is a glass roving and is wrapped helically about the tubular member 28. Each roving is characterized by a load carrying capability in tension of about 88 lbs. per one percent strain. The load per unit strain is defined as stiffness.

Another component of the strength member system 32 is an outer second layer 50 of strength members which are in engagement with the strength members 42-42 of the inner layer 40. As can be seen in the drawings, each of the majority of the strength members of the outer layer is designated 52 and comprises a relatively inflexible rod-like member which is made of glass fibers in the form of a yarn or roving. Such glass rods are available commercially from the Air Logistics Corp. under the designation E-glass tape. In the embodiment shown in FIG. 1, the outer layer 50 also includes several of the strength members 42-42. For the preferred embodiment, the strength members 52-52 and 42-42 of the outer layer are wrapped helically about the strength members of the inner layer but in an opposite helical direction from those of the inner layer.

Although in the preferred embodiment, the strength member system includes two layers of helically wrapped strength members, other arrangements come within the invention. For example, the strength members of the cable 20 may be assembled to the cable without intended stranding (see FIG. 3).

Figure 3:
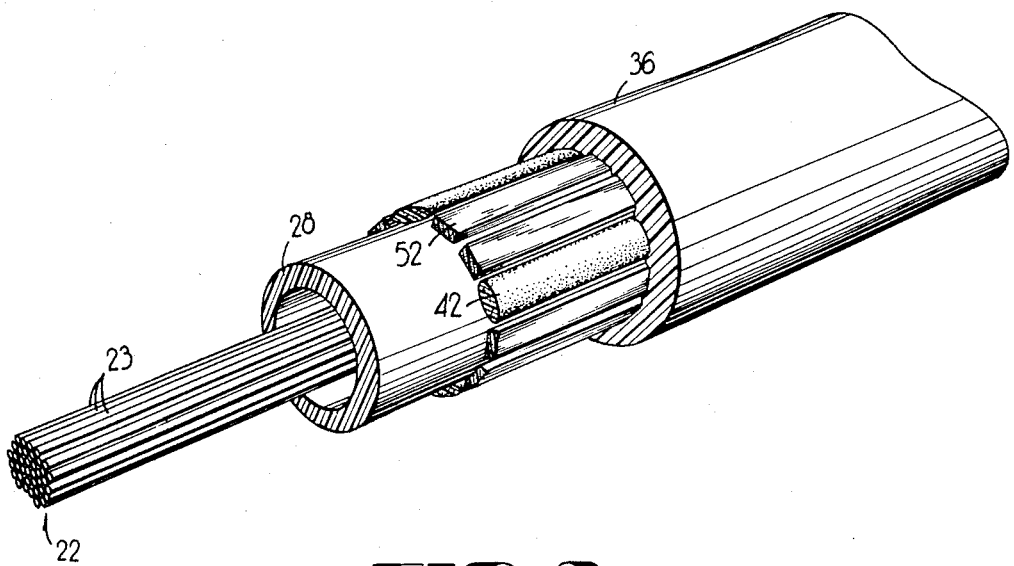
FIG. 3 is a perspective view of another cable of this invention.
Figure 4:
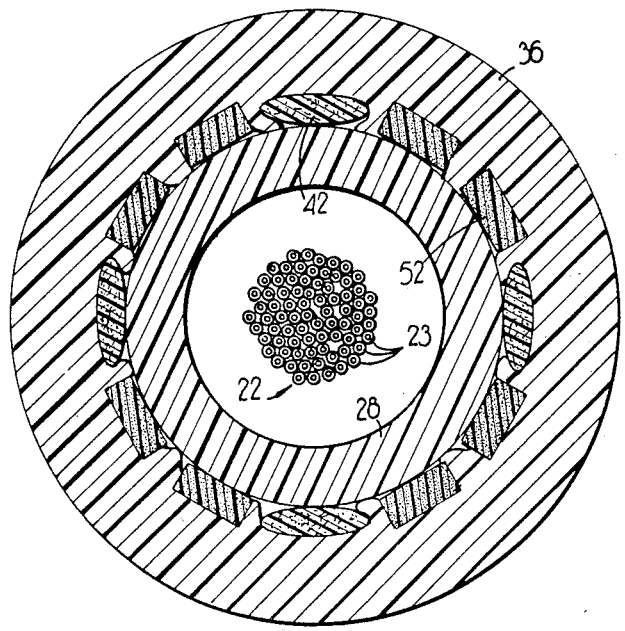
FIG. 4 is an end view of the cable of FIG. 3.

Also the strength members may be disposed in a single layer (see FIGS. 3 and 4). This is particularly true in a ribbon core cable in which the outer diameter of the tubular member 28 is larger than for the cables of FIGS. 1 and 2, thereby allowing a greater number of strength members to be disposed about its circumference.

It should be noted that each of the rod-like members 52-52 and the relatively flexible strength members 42-42 of the preferred embodiment comprises a substrate which is made of E-glass fiber filaments. Each substrate may comprise as many as 4000 fiber glass filaments. For the strength members 52-52 of the preferred embodiment, the substrate is impregnated with an epoxy material. This causes the substrate to become relatively stiff and is rendered capable of withstanding expected compressive as well as tensile stresses. Expected compressive stresses include those which are induced by thermal cycling, and initial shrinkage of the jacket material, for example. In the preferred embodiment, each strength member 52 is characterized by a tensile stiffness of about 78 lbs. per one percent strain.

For the strength members of the inner layer 40 and for several of the strength members of the outer layer of the preferred embodiment, the glass fiber substrate is a roving and must be treated further to maintain suitable strength properties. Although the glass fibers are sized, the sizing is not sufficient to prevent abrasion among the fibers when they slide relative to one another during tensile loading of the cable 20. Accordingly, in order to prevent a degradation of the tensile strength properties of the roving, it is impregnated with a polyurethane matrix material. Unlike the epoxy material, the polyurethane material does not cause the roving to become relatively inflexible. Instead, it preserves the flexibility and tensile strength of the glass roving while preventing abrasion among the fibers when slippage therebetween occurs. The strength members 42-42 are sufficiently flexible and are sufficient in number to cause the cable 20 to be relatively flexible.

Torque balancing of the cable of FIGS. 1 and 2 is made easier because the absence of an inner jacket between the layers of the strength members allows the use of the same lay length for the strength members of both layers. Further, a lay length which is longer than that of some prior art cables may be used. This allows the use of higher line speeds during manufacture of the cable.

In order for the cable to have suitable strength characteristics, the strength member system must be coupled to the jacket 36. It should be understood that the plastic of the outer jacket encapsulates portions of the strength members and couples thereto. If the coupling of the strength members to the jacket is excessive, bending of the cable could result in buckling of the strength members with respect to the jacket 36. Therefore, provisions must be made for controlling the coupling of the strength members to the jacket 36.

Figure 5:
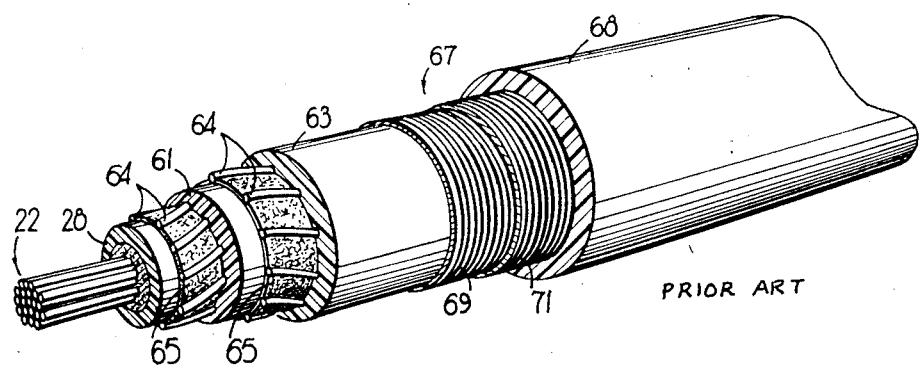
FIG. 5 is a perspective view of a prior art optical fiber cable.
Figure 6:
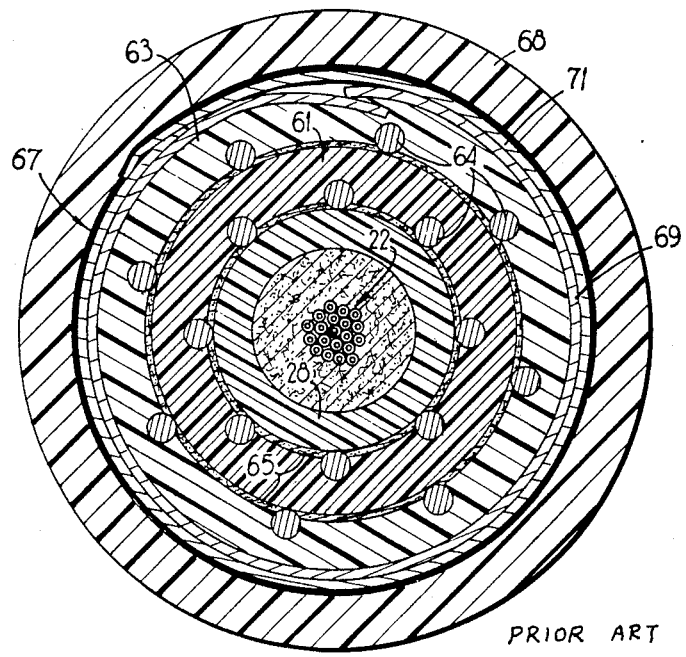
FIG. 6 is an end view of the prior art optical fiber cable of FIG. 5.

In earlier mentioned U.S. Pat. No. 4,241,979, which is incorporated by reference hereinto, a bedding layer shields portions of the strength members from the extrudate of the enclosing jacket. As shown in FIGS. 5 and 6, the core 22 and tubular member 28 are surrounded by an inner jacket 61 and an intermediate jacket 63 each of which jackets is made of a plastic material. Further, partially embedded in each jacket 61 and 63 are a plurality of longitudinally extending strength members 64-64 which may be steel wires or glass rods. Portions of the strength members are in intimate contact with bedding layers 65-65 to render predetermined surfaces of the strength members sufficiently inaccessible for coupling with the plastic extrudate which is used to provide the overlying jacket. This reduces jacket-strength member coupling so that the strength members can more readily slide with respect to the jacket plastic during local cable bending.

The prior art cable of FIGS. 5 and 6 may also be provided with an oversheath shield system 67 which underlies an outer jacket 68. The shield system 67 may include an inner metallic shield 69 and an outer metallic shield 71 which is bonded to the jacket 68 to enhance moisture protection and to enhance the mechanical performance of the cable. This cable is disclosed and claimed in U.S. Pat. No. 4,557,560 which issued on Dec. 10, 1985 in the names of W. D. Bohannon, Jr. et al.

The arrangement of FIGS. 1 and 2 also is effective to control any coupling between the strength members and the jacket 36. Portions of the strength members are sufficiently inaccessible for coupling with the plastic jacket 36. Portions of the strength members of the inner layer which engage the core tube 28 and the portions of the strength members of each layer which engage each other are not embedded in plastic material and hence are decoupled from the jacket. This prevents complete encapsulation of the strength members. As a result of this arrangement, a slippage plane is provided for the plurality of longitudinally extending strength members which are disposed along the tubular member 28.

During manufacture, the strength members are caused to be disposed about the tubular member 28 under tension so that portions of the surfaces of the strength members make intimate surface contact with the tubular member and with each other. Then, the jacket 36 is pressure-extruded over the strength members. The contact between the inner layer 40 of strength members and the core tube and between the inner and outer layers of strength members is such as to inhibit the flow of the jacket plastic extrudate to the portions of the surfaces so that encapsulation of those surfaces is prevented. This reduces jacket-strength member coupling sufficiently so that the strength members can more readily slide with respect to the jacket during local cable bending.

Preventing encapsulation of these surfaces has little effect on the reinforcing tensile strength of the strength members. When the extruded plastic material of the jacket 36 cools during manufacture, it forms a tight fit about at least some of the strength members. During tensile loading of the cables, the helically wrapped strength members attempt to move radially but are prevented from doing so by the underlying tubular member 28. For the strength members which engage the tubular member in a single layer system or for those of the outer layer which engage the inner layer, the jacket forms generally a split-type ring. This arrangement substantially mitigates against relative circumferential movement of the strength members with respect to the jacket, and more easily allows relative movement of the strength members in a longitudinal direction with respect to the jacket under local bending.

Sufficient coupling exists between strength members of the cable of this invention and the jacket 36 to ensure composite structural behavior between those strength members and the jacket in a longitudinal direction over the complete length of the cable. Such coupling is established with the strength members immediately adjacent to the jacket 36. Therefore, in order to provide the cable of the preferred embodiment with suitable compressive strength, it is important that the relatively inflexible strength members 52-52 are disposed in the outer layer 50 and contiguous to the jacket 36. This arrangement allows the strength members 52-52 to become coupled sufficiently to the jacket 36 so that those strength members and the jacket provide a composite arrangement which is effective to inhibit contraction of the cable. Constraction of the cable may occur during initial shrinkage of the plastic jacket material and during exposure to temperatures which may be as low as −40° F. If only the relatively flexible strength members 42-42 were contiguous to the jacket 36, the composite arrangement of them and the jacket may not be effective to withstand expected buckling forces. The cables of this invention provide excellent optical performance with substantially no added losses at temperatures at least as low as −40° F.

The cable of this invention is such that it can withstand a 600 lb load at a strain which does not exceed 0.33%. Viewing now FIG. 7, there is shown a graph 80 of load versus strain. In that graph, a curve 82 reflects the relationship of load and strain for one prior art cable discussed hereinbefore. As will be recalled, that one prior art cable includes two layers of strength members with the layers being separated by an inner jacket and with all the strength members being relatively stiff glass rods. Because the cable 20 of this invention includes a plurality of relatively flexible glass fiber members in the inner layer in a somewhat undulated configuration longitudinally of the cable, portions of a tensile load are not immediately taken up by them but only after they are taut. As a result, a curve 90 which depicts the relationship of load and strain for the cable of this invention includes a portion 92 which has a slope that is less than that of the curve 80 for the prior art cable. In order to prevent the strain at a 600 lb loading from exceeding 0.33%, the remainder of the curve 90, that is a portion 94, has a slope greater than that of the portion 92 and greater than that of the curve 80 of the prior art cable.

Figure 7:
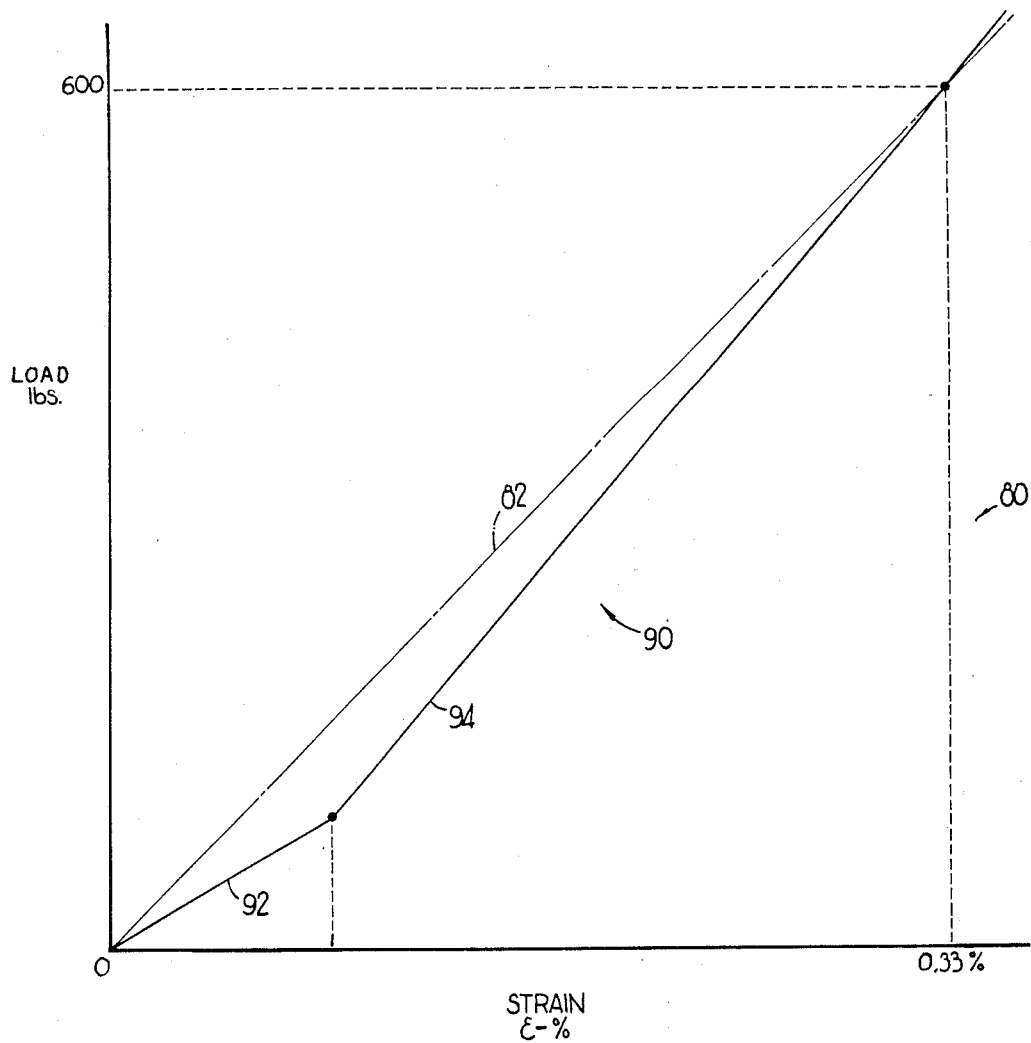
FIG. 7 is a graph which shows curves of force plotted against strain for a prior art cable and for one embodiment of a cable of this invention.

It should be noted that the force-strain curves characteristic of the cables of this invention need not include a knee as shown in FIG. 7. The relative numbers of the two kinds of strength members may be optimized to provide the cable with sufficient strength characteristics as well as flexiblity. For example, the number of relatively stiff strength members 52-52 may be increased sufficiently to cause the force-strain curve to be similar to the curve 82 which is unbroken. Of course, such a cable would include a plurality of strength members 42-42, although not as many as shown in FIGS. 1 and 2, to impart flexibility to the cable.

In the preferred embodiment of this invention, inner and outer diameters of the core tube are 0.17 inch and 0.24 inch, respectively, whereas inner and outer diameters of the outer jacket are 0.32 and 0.42 inch, respectively. The inner layer 40 includes twelve rovings 42-42 and the outer layer 50 includes two rovings 42-42 and ten glass rod-like members 52-52 with all of the members being equally spaced about the cable periphery. Also, in the preferred embodiment, the two rovings 42-42 in the outer layer are diametrically opposite to each other.

The advantages of the cable 20 of this invention should be apparent. For example, the inner jacket of plastic material of prior art cables has been removed. Also, a hybrid mix of relatively flexible and relatively stiff, rod-like glass fiber members, instead of glass rods exclusively, has been used to provide the tensile stiffness which is required for the cable and to cause the resulting cable to be more flexible than its predecessor. Although the monolithic strength member system of the prior art has been replaced with a hybrid system of this invention, the strength system is such that it is capable of a predetermined load carrying capacity at a strain which is less than a predetermined value.

The cable 20 of this invention is characterized by several additional advantages over cables of the prior art. For example, it is more flexible and has a smaller outer diameter than the so-called cross-ply cable of U.S. Pat. No. 4,241,979. Also, as can be seen from FIGS. 5 and 6, because the layers of strength members of the prior art cable depicted therein are separated by an inner jacket, a longer lay length is required for each of the helically wound strength members in the outer layer than for each strength member of the inner layer in order to manufacture a torsionally balanced cable. With the cable of this invention, the strength member layers are contiguous to each other which allows the use of a lay length which is the same for both layers and which is longer than that of the inner layer of prior art cables. In the preferred embodiment the lay length of each strength member is about 12.5 inches.

Also, the cable 20 of this invention has a non-metallic sheath system whereas in the cable of FIGS. 5 and 6, metallic strength members are used and a metallic shield system underlies the outer jacket. As a result, the cables of FIGS. 1, 2, and 3 do not require metallic grounding arrangements across splices and in closures. Further, the inventive cable is much less apt to be victimized by lightning strikes.

It should be understood that the above-described arrangements are simply illustrative of the invention. Other arrangements may be devised by those skilled in the art which will embody the principles of the invention and fall within the scope and spirit thereof.

What is claimed is:

1. An optical fiber cable, which comprises:
    a core comprising at least one optical fiber;
    a tubular member which is made of a dielectric material and which encloses said core;
    a jacket which is made of a plastic material and which encloses said tubular member; and
    a strength member system which is interposed between said tubular member and said jacket and which comprises strength members made of a dielectric material with a first plurality of said strength members being relatively flexible and with a second plurality thereof having sufficient compressive stiffness and being coupled sufficiently to said jacket to provide a composite which is effective to inhibit contraction of said cable, said first and second pluralities of strength members cooperating to provide said cable with a predetermined tensile stiffness.

2. An optical fiber cable, which comprises:
    a core comprising at least one optical fiber;
    a tubular member which is made of a plastic material and which encloses said core;
    a jacket which is made of a plastic material; and
    a strength member system which is disposed between said tubular member and said jacket and which is effective to provide said cable with a predetermined tensile stiffness, said strength member system comprising:
an inner layer of longitudinally extending strength members which are made of a dielectric material; and
an outer layer of longitudinally extending strength members which are made of a dielectric material and which engage said inner layer of strength members and said jacket, with a plurality of the strength members of said outer layer having sufficient compressive stiffness and being coupled sufficiently to said jacket to provide a composite arrangement which is effective to inhibit contraction of said cable and with the remaining strength members of said outer layer being relatively flexible.

3. The optical fiber cable of claim 2, wherein the strength members of said inner layer engage said tubular member.

4. The optical fiber cable of claim 2, wherein each of said relatively flexible strength members comprises a glass roving having a tensile stiffness of about 88 lbs. per 1% strain.

5. The optical fiber cable of claim 4, wherein each of said strength members of said inner layer comprises a glass fiber roving which has been impregnated with a polyurethane material.

6. The optical fiber cable of claim 2, wherein a plurality of the strength members of said outer layer are relatively inflexible.

7. The optical fiber cable of claim 6, wherein each of said relatively stiff strength members is rod-like and is made of a glass material.

8. The optical fiber cable of claim 6, wherein each of the rod-like strength members of said outer layer comprises a glass fiber strand material which has been impregnated with an epoxy material.

9. The optical fiber cable of claim 2, wherein said strength members are such that said cable is capable of being loaded with about 600 lbs at a strain which does not exceed about 0.33%.

10. The optical fiber cable of claim 2, wherein each of said strength members of said inner layer is wrapped helically about said tubular member.

11. The optical fiber cable of claim 10, wherein each of said strength members of said inner layer has a lay length of about 12.5 inches.

12. The optical fiber cable of claim 10, wherein each of said strength members of said outer layer is wrapped helically about said inner layer of strength members.

13. The optical fiber cable of claim 12, wherein each of said strength members of said outer layer has a lay length of about 12.5 inches.

14. The optical fiber cable of claim 12, wherein said inner and outer layers are wrapped helically about said tubular member in opposite directions.

15. The optical fiber cable of claim 2, wherein each of said strength members is caused to be disposed about said core without intended stranding.

* * * * *